United States Patent [19]
Clark

[11] Patent Number: 5,359,375
[45] Date of Patent: Oct. 25, 1994

US005359375A

[54] MICROPROCESSOR PROGRAMMABLE DIGITAL REMOTE RADIO PHOTOGRAPHIC CONTROL

[75] Inventor: James E. Clark, Charlotte, Vt.
[73] Assignee: Lab Partners Associates, Inc., S. Burlington, Vt.
[21] Appl. No.: 985,265
[22] Filed: Dec. 3, 1992
[51] Int. Cl.⁵ ............................................. G03B 15/03
[52] U.S. Cl. .................................... 354/131; 354/266
[58] Field of Search ............. 354/131, 132, 266, 267.1

[56] References Cited
U.S. PATENT DOCUMENTS 4,816,850  3/1989  Philipeaux et al. ................ 354/131
5,159,375  10/1992  Taniguchi et al. ................ 354/266
5,283,610  2/1994  Sasaki ............................... 354/131

*Primary Examiner*—David M. Gray
*Attorney, Agent, or Firm*—Donald W. Meeker

[57] ABSTRACT

A radio transmitter and radio receivers are each connected to microprocessors with non-volatile memories. Binary encoded sequenced pulses are transmitted from the transmitter to program the receivers remotely. A variety of precisely coded signals can be transmitted including a unique transmitter number, a receiver number, data for the receiver, commands for the receiver, and an error detection command. Heterodyne receiver systems with local oscillators, level detectors and noise controllers mix a transmitted 344.035 MHZ signal with a local 333.335 MHZ signal to generate an intermediate frequency of 10.7 MHZ to which the filters are tuned. Over 100 dB of gain is available in the receiver amplifiers making it very sensitive. Single activation, multiple activation, sequencing, and delays are all programmable with a number of receivers. Applications include activating photographic equipment such as remote lighting, additional cameras, light positioning devices, testing devices, and other photographic applications requiring remote programmable control ranging over 1000 feet with high accuracy and coded security.

20 Claims, 8 Drawing Sheets

MICROPROCESSOR PROGRAMMABLE DIGITAL REMOTE RADIO PHOTOGRAPHIC CONTROL

BACKGROUND OF THE INVENTION

1. Technical Field

The present invention relates to remote control systems for photographic equipment, and in particular to a programmable remote control using microprocessors for both digitally encoded radio signal transmitters and receivers to control a number of functions and pieces of equipment related to lighted photography.

2. Description of the Prior Art

Remote lighting for photography can be a major problem, especially for outdoor shots. Photographing a building or other outdoor scene presents a major problem when the lights must be quite close to the building or scene and the camera must be further away to take in the entire building or scene. Originally, cables were used for remote photography lighting. But now, in most towns it is illegal to string cables across a street. Even when possible to use them, cables present problems: they are heavy and unwieldy and tangle easily and the cables must be hidden from view in the photograph.

A number of remote control devices, sometimes called "radio slaves", use wireless transmission systems to set off remote flash units for photographing distant scenes. Early radio slave units had a very limited range (75 feet maximum), and had no provision for selecting individual remote flashes. More recent units have a slightly better range (100–250 feet). There is a regulatory problem relative to range. The FCC limits the frequency of radio waves averaged over a short time and limits the amount of time of transmission after activating a signal to five seconds of carry-over transmission.

The principle on which radio slave units work does not lend itself to reliable operation; they misfire often. Misfiring presents problems with getting a well-lighted picure. Other difficulties include the recycle time for flashes to be ready for the next flash and a limited number of flashes possible on a battery charge.

More recent radio slave units have selections for different "channels", but they can only set off one of the channels at a time. This means that the photographer has to set the channel of each receiver before going back to the camera. There is no provision for changing flash groupings from the camera. It all has to be done at the flash units.

Prior art units are limited in the functions they perform. Some have a delay feature, but not in a remotely controlled system, and the delay time is the same between flashes. Changeable sequencing and changeable delays are generally not possible from the control unit. And the prior art systems generally serve to set off the flash units only.

Prior art devices that employ light signals from the camera to the flash units are very simple with only a flash activation capability.

DISCLOSURE OF INVENTION

The present invention provides an "intelligent" transmitter and an "intelligent" receiver of encoded digital radio signals by incorporating microprocessors with memory in both the transmitter and the receivers. This enables the system to program a multitude of functions to be performed by the receivers and also enables the transmitter to program the receiver units in the field without having to go to each receiver to make changes. In the case of photographic applications, the system can produce remote, field-encoded sequencing of different flash units with any desired delays, any combination or number of flashes, any desired light intensity, testing of the units, and control over any add-on external devices such as other lights or motor controls to adjust flash angles and positions or triggering other cameras or any other desired external devices. Great flexibility and speed and ease of use result with all of the control and programming done from the transmitter at the camera.

Transmitting a high frequency radio signal for a very short duration (20 dB greater than the FCC standard limit due to the duty cycle factor) increases the range of effective operation of the transmitter and still stays within FCC guidelines when the signal is averaged over the standard testing time. Using a constant frequency radio signal which is turned on and off according to a timed sequence with digitally coded pulses and non-pulses observed in measured time segments creates very precise control with detailed coding of operations. Each time segment is a bit that is either a pulse (0 in binary code) or no pulse (1 in binary code). Eight coded time segments or bits constitute one byte of information. Ranges of 300–1000 feet have been achieved with complete accuracy and no false flashes.

"Smart" transmitters and receivers enable the use of a complex security coding program which insures that the receivers will only respond to the appropriate transmitter with the appropriate commands. Both the tranmitter and the receiver have a non-volatile memory that is used for storing permanent information such as ID numbers, delay times, and other information. The transmitter "teaches" the receiver to respond only to signals sent with the coded serial number of the transmitter. No false flashes or misfires can occur because the receivers will not respond to any other signals but those from the matched transmitter. Security and accuracy are insured by using programmed digitally encoded signals including the transmitter number, a receiver number, data for that receiver, an operational command, and error detection signals. Digital commands are sent from the trasmitter to the receiver units at a high data rate. Each receiver checks the commands for errors and, if no error is found, will execute the commands.

Commands are programmed into the receivers from the transmitter as they are punched into the keyboard on the transmitter. When all receivers have been properly programmed for desired sequencing and delays, activating the camera creates an activation signal transmitted to the receivers to carry out the programmed commands. This short activation burst lasts a fraction of a second well within the FCC five second guideline.

A superheterodyne receiver system sends, from a local oscillator, a signal of (333.335 MHZ) which is mixed with the higher frequency (344.035 MHZ) from the transmitter to produce an intermediate frequency of 10.7 MHZ, with over 100 dB of gain available in the receiver amplifiers for precise tuning to make it very sensitive. The intermediate frequency 10.7 MHZ is the industry standard for FM radios and inexpensive filters and other components are readily available to lower the cost of the system. More precise tuning of the amplifier circuit, making it more sensitive and selective for accurate pick-up and interpretation of the transmitted digital code enables the system to perform multiple functions accurately and only in response to the matched transmitter.

Using microprocessor chips enables both the transmitter and receiver to be miniaturized to hand-held instruments which can fit into the pocket of a user.

BRIEF DESCRIPTION OF THE DRAWINGS

These and other details and advantages of my invention will be described in connection with the accompanying drawings, which are furnished only by way of illustration and not in limitation of the invention, and in which drawings.

BEST MODE FOR CARRYING OUT THE INVENTION

Figure 1:
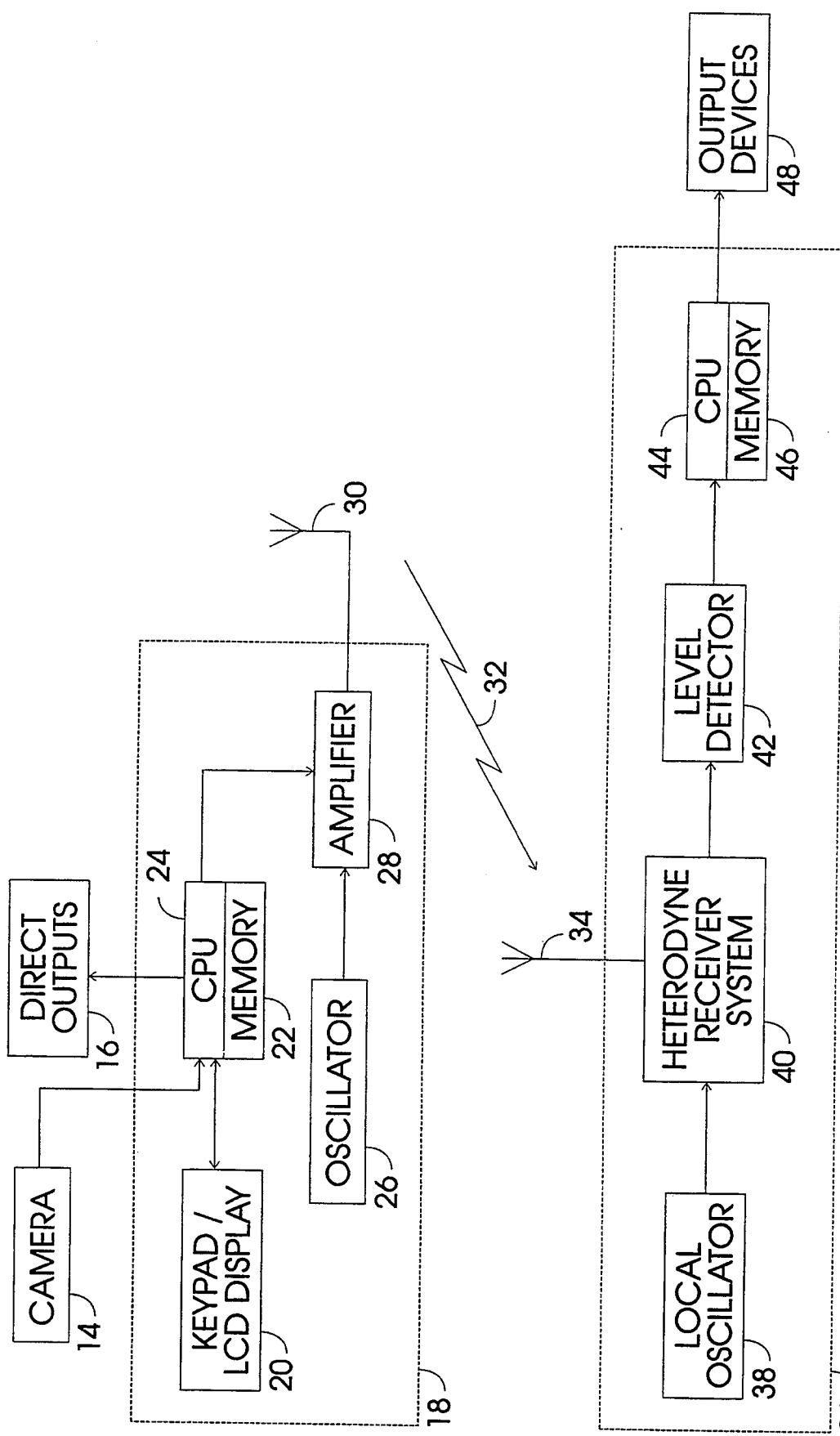
FIG. 1 is a block diagram of the programmable transmitter and programmable receiver with camera input into the transmitter, a radio signal from the transmitter to the receiver, and outputs to various devices from both the transmitter and the receiver.

In FIG. 1 a multifunction programmable remote control system for photographic equipment comprises a programmable transmitter 18 and one or more programmable receivers 36 to activate photographic equipment through outputs 48 from each receiver and also direct outputs 16 from the transmitter in response to activation of a camera 14 or other trigger device plugged into the programmable transmitter.

Figure 2:
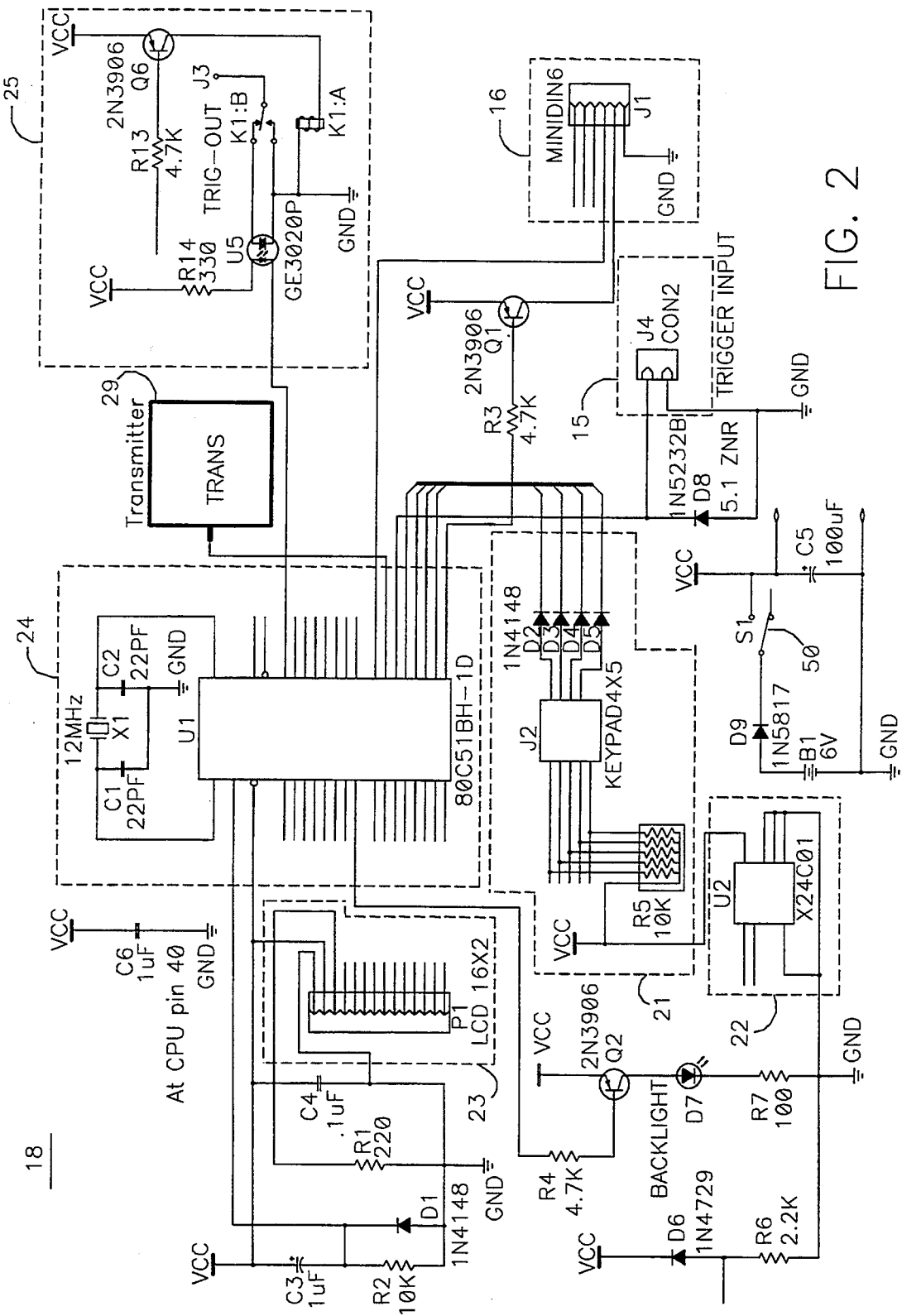
FIG. 2 is an electrical schematic view of the programmable transmitter circuit.
Figure 3:
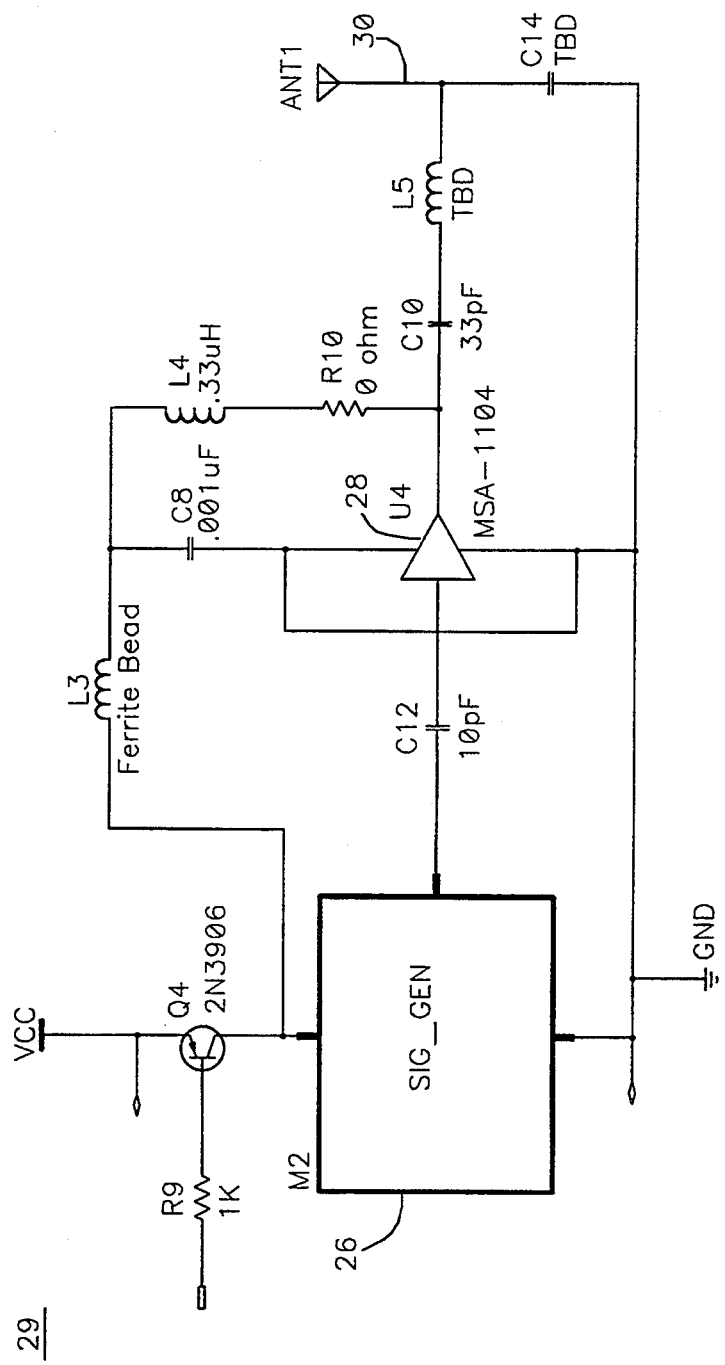
FIG. 3 is an electrical schematic view of the oscillator, amplifier, and antenna circuits of the programmable transmitter.

The programmable transmitter 18 (also shown schematically in FIG. 2) comprises a microprocessor or central processing unit (CPU) 24 with a non-volatile memory 22. The CPU 24 is electrically connected to a radio transmitter 29 (shown schematically in FIG. 3) which has an oscillator 26 (circuit shown schematically in FIG. 4) and an amplifier 28. For speed, the oscillator crystal 27 is constantly enabled once the power switch 50 is turned on, and the CPU 24 activates the amplifier 28 and oscillator amplifier 31 to modulate radio transmissions through the first antenna 30. In FIG. 2 a direct output circuit 25 enables the CPU to program direct outputs 16 for wired-in equipment in addition to the remote receiver controlled equipment.

Figure 9:
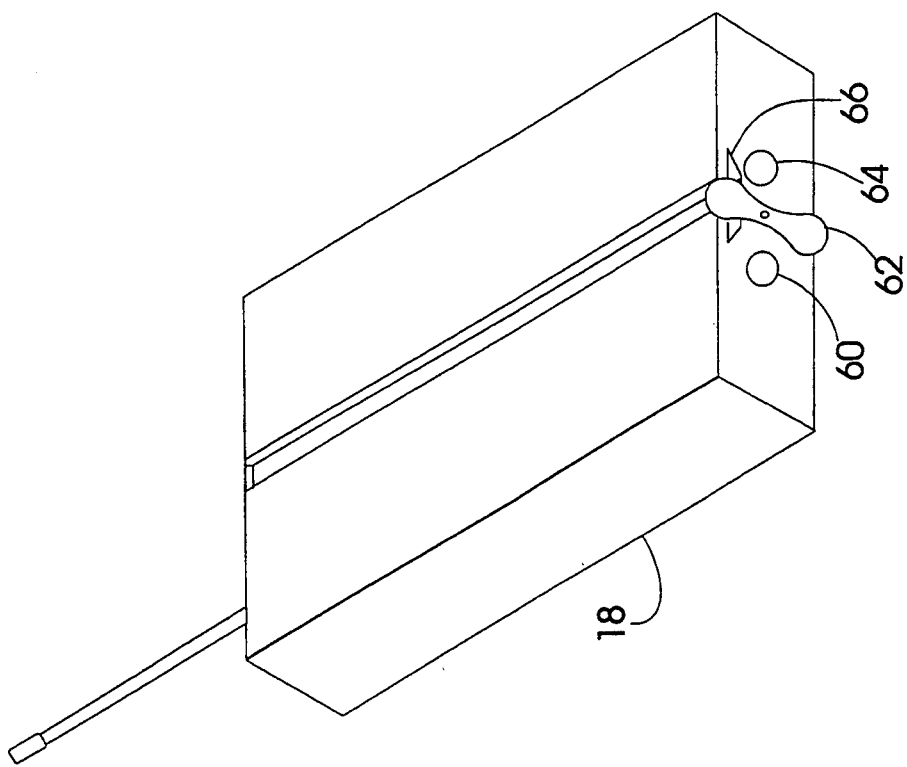
FIG. 9 is a perspective view of the rear, bottom, and side of the hand-held programmable transmitter.
Figure 8:
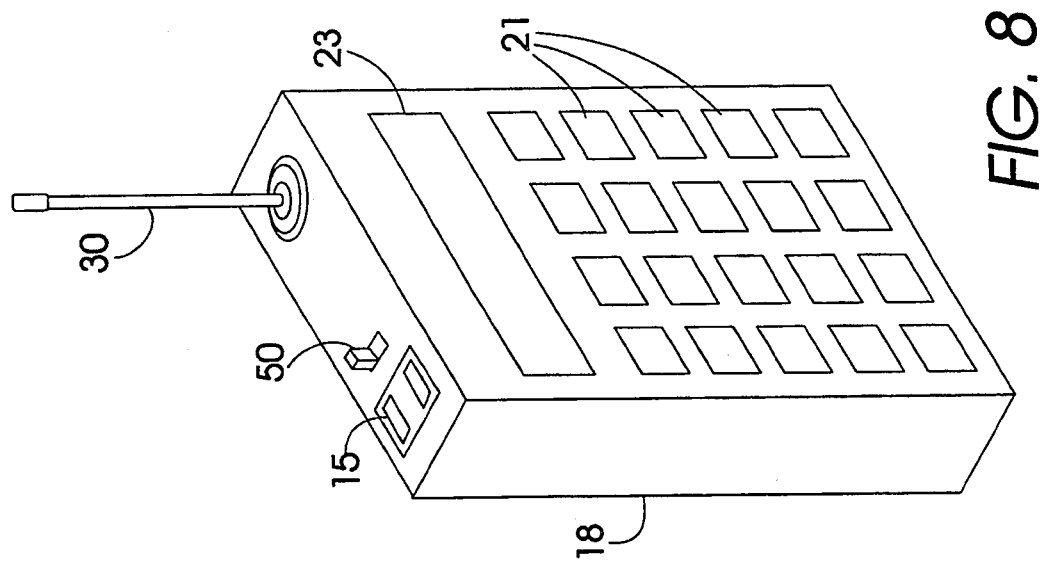
FIG. 8 is a perspective view of the front, top, and side of the hand-held programmable transmitter.

The hand-held case for the programmable transmitter 18 (shown in FIGS. 8 and 9) is provided with a keypad 21 for programming the transmitter and an LCD display 23 to use in the programming and for feedback about the system. FIG. 2 shows the schematics for the keypad 21 and LCD display 23 circuits. A camera cord plugs into the two-prong receptacle 15 (trigger input in FIG. 2) on top of the unit to trigger the programmable transmitter 18 in response to pushing the shutter activation button on the camera (14 in FIG. 1). Power is supplied to the transmittor 18 by loading four AA batteries into the openings 60 and 64 in the base of the transmitter as shown in FIG. 9. A swivel cover 62 secures the batteries in the openings. (A similar battery system is used to power the receivers 36.) A slot 66 along the vertical centerline of the back of the transmitter slidably receives a screw head from a tripod for mounting the transmitter. A belt clip or hand strap or Velcro strip on the back of the transmitter are other possible mounting means.

Figure 4:
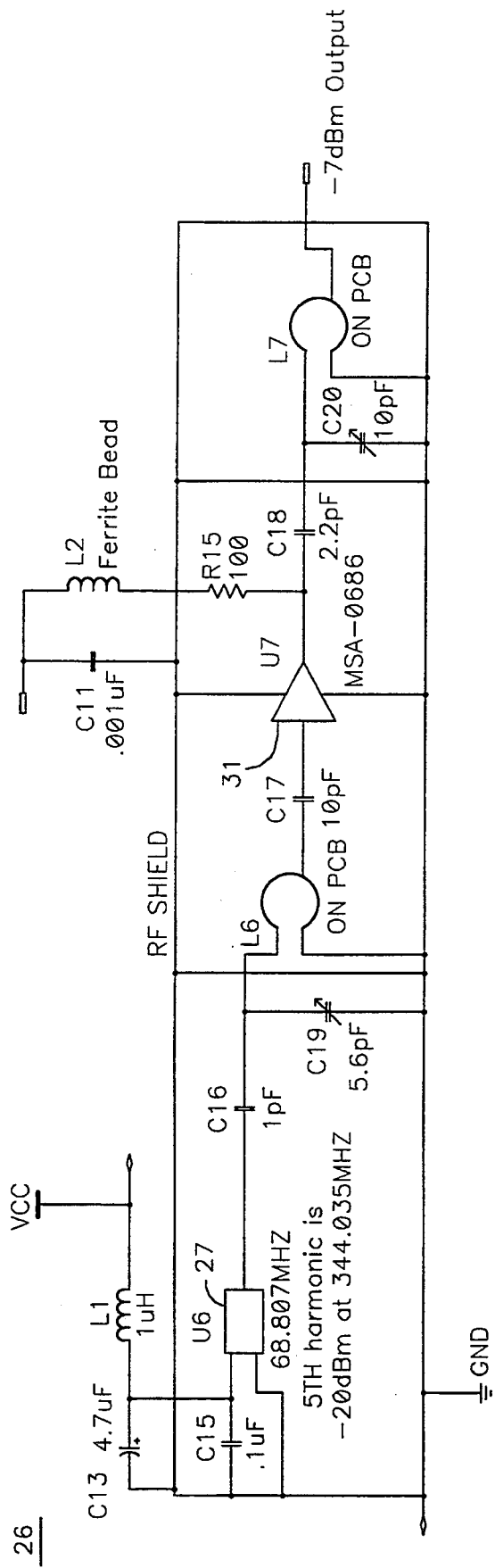
FIG. 4 is an electrical schematic view of the oscillator circuit of the programmable transmitter.

The oscillator 26 in FIG. 4 uses a crystal controlled clock oscillator 27 at 68.807 MHZ to generate a 344.035 MHZ signal 32 from the first antenna 30 to the second antenna 34 of each of the receivers 36. Since the output of the crystal oscillator is a squarewave, the output will have many high level odd harmonics. By filtering off all but the 5th harmonic of this crystal a "clean" 344.035 MHZ sinewave can be created.

The user by pressing the keypad 21 programs the CPU 24 to digitally encode the radio signals 32 transmitted from the transmitter antenna 30. Short quick pulses of high frequency transmit over longer distances and still meet FCC guidelines. The constant frequency radio signal (344.035 MHZ) is encoded by pulsing according to a programmed series of pulses (transmissions) and non-pulses (non-transmissions) in equal time segments. Each equal time segment comprises a bit and eight time segments or bits constitute one byte of information in binary code. A pulse is the binary 0 and a non-pulse is the binary 1. Each byte is sent serially one bit at a time in a synchronized manner. The system is resynchronized after every byte to insure proper transmission. Using binary code, complex information may be transmitted to the receivers.

Figure 5:
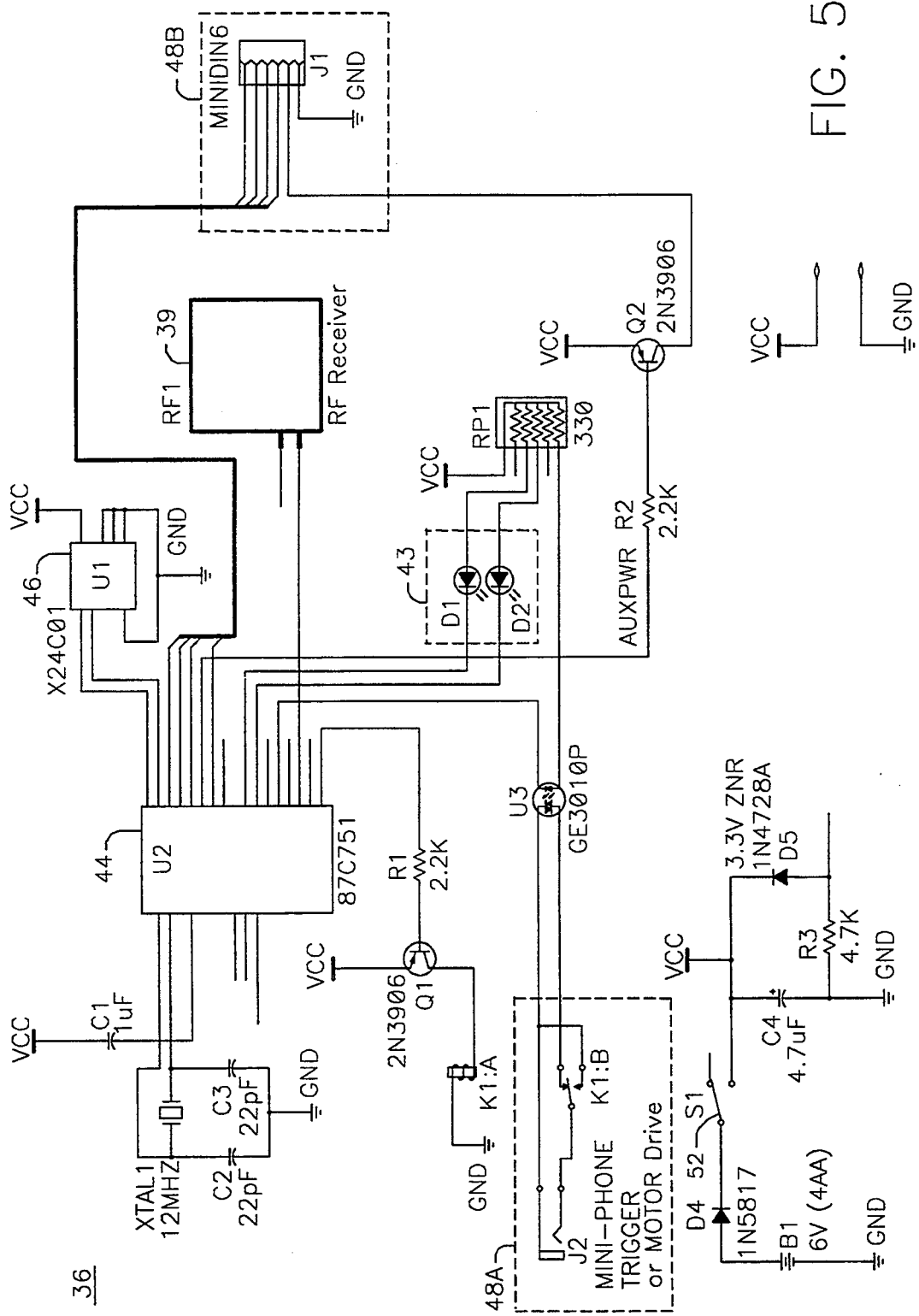
FIG. 5 is an electrical schematic view of the programmable receiver circuit.
Figure 6:
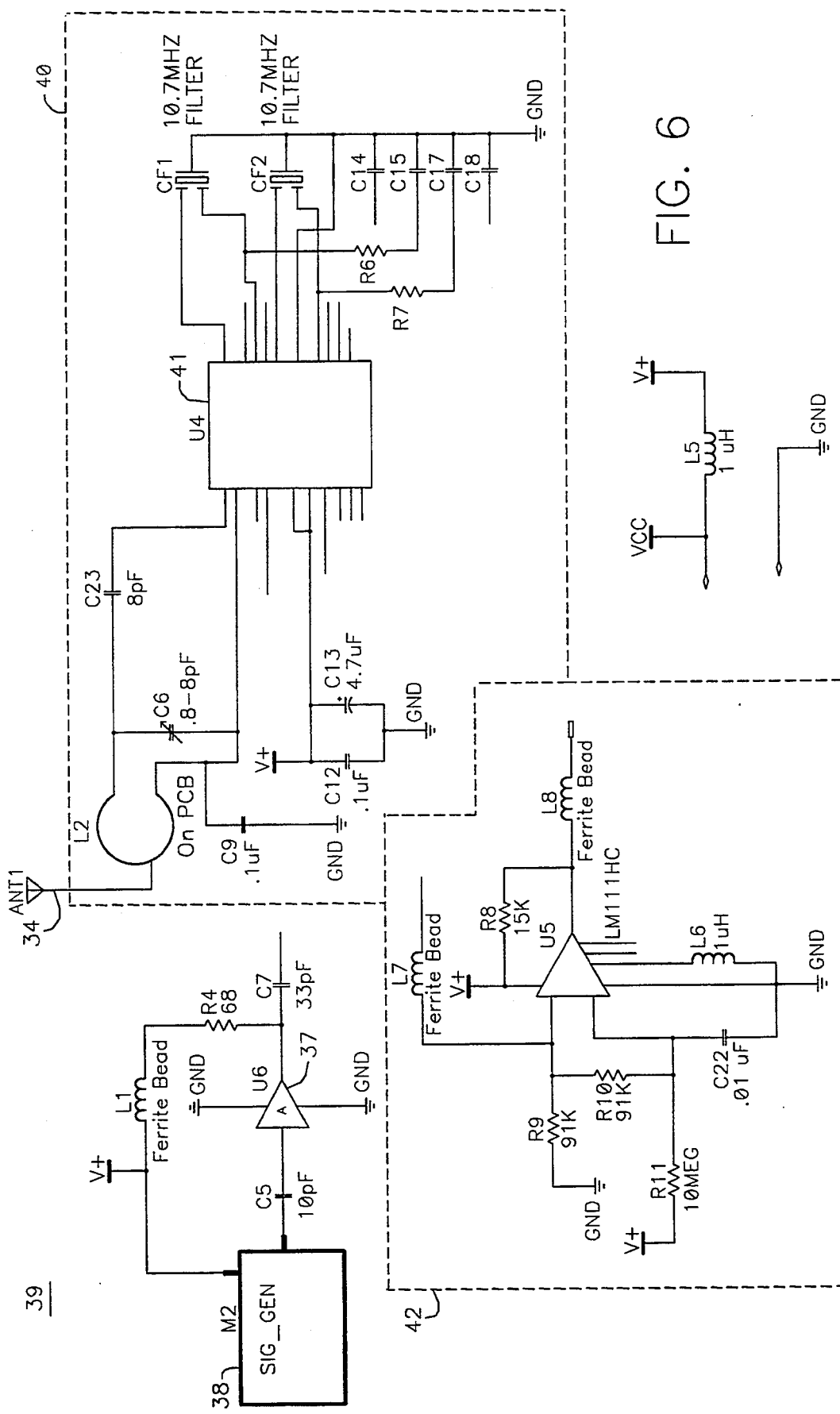
FIG. 6 is an electrical schematic view of the local oscillator, heterodyne receiver system, and level detector circuits of the programmable receiver.

In FIG. 1 the programmable receiver 36 (also shown schematically in FIG. 5) comprises a microprocessor or central processing unit (CPU) 44 with a non-volatile memory 46. The CPU 44 is electrically connected to a radio receiver 39 (shown schematically in FIG. 6). The radio receiver 39 comprises a heterodyne receiver system 40 (including a superheterodyne chip 41) fed signals from a local oscillator 38 (shown schematically in FIG. 7) with an amplifier 37 (in FIG. 6) and from the transmitter via antenna 34. A level detector 42 (and noise control) circuit (shown in FIG. 6) focuses on the level of the signals as determined by the heterodyne circuit using the encoded signals.

The hand-held case for the programmable receiver (not shown) is similar to, but shorter than, the transmitter case without the keypad and LCD display but with an antenna 34 and with additional indicator lights 43 (in FIG. 5) to indicate low battery, selected receiver ready for trigger, receiver triggered, and receiver ID number (number of flashes). Similar to the transmitter case, a slot along the vertical centerline of the back of the transmitter slidably receives a screw head from a tripod for mounting the transmitter. A belt clip or hand strap or Velcro on the back of the transmitter are other possible mounting means. A trigger or motor drive output 48A is provided to activate the remote photographic equipment and additional outputs 48B for other equipment are also provided.

Figure 7:
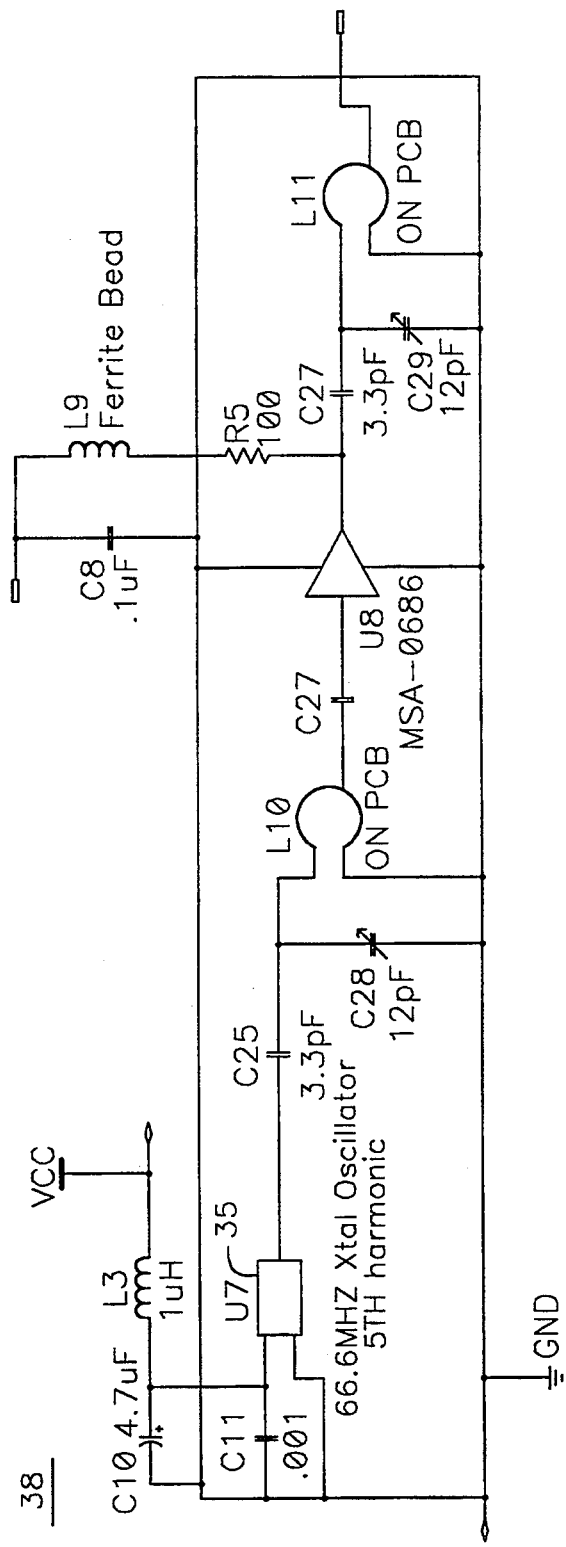
FIG. 7 is an electrical schematic view of the local oscillator circuit of the programmable receiver.

When the power switch 52 (in FIG. 5) is turned on, the local oscillator 38 in FIG. 7 uses a crystal controlled clock oscillator 35 at 66.666 MHZ to generate a 333.335 MHZ signal. Since the output of the crystal oscillator is a squarewave, the output will have many high level odd harmonics. By filtering off all but the 5th harmonic of this crystal a "clean" 333.335 MHZ sinewave can be created. When this 333.335 MHZ oscillator is mixed with the transmitter's 344.035 MHZ oscillator output an intermediate frequency (I.F.) of 10.7 MHZ (the difference between the two frequencies) is generated. The receiver's filters are tuned to this 10.7 MHZ I.F. signal. Over 100 dB of gain is available in the receiver amplifiers making it very sensitive.

When the programmable receiver detects the presence of the correct signal from the programmable transmitter, a processor interrupt is generated, causing the receiver to "wake up" and start receiving data. The receiver CPU 44 is programmable remotely from the transmitter and is programmed to check commands from the transmitter for errors and, if no error is found, to execute the commands. The transmitter sends a series of digitally encoded signals comprising a unique transmitter number, a receiver number, data for the receiver, commands for the receiver, and an error detection command. Only when all of the data is checked for accuracy and correct transmitter and receiver numbers will the programmable receiver execute the commands received.

The programmable receiver outputs (and the direct output on the transmitter) can be used to activate any desired photographic or other equipment in any desired number and sequence with programmed delays. Photographic lighting means such as strobes, flashes, studio lights, outdoor flood and spotlights can be programmed with single flashes, multiple flashes, delays, and variable combinations and sequences of flashes. Other photography applications include additional cameras, brightness control, positioning and angling of lighting and cameras, testing equipment, shade control, and any other electrically activated equipment.

It is understood that the preceding description is given merely by way of illustration and not in limitation of the invention and that various modifications may be made thereto without departing from the spirit of the invention as claimed.

I claim:

1. A multifunction programmable remote control system for photographic devices wherein the system comprises
    a programmable transmitter comprising a first microprocessor electrically connected to a radio transmitter and a first power source for sending digitally encoded signals;
    a programming means for digitally encoding the radio signals;
    at least one signal receiving means wherein the signal receiving means comprises a programmable receiver comprising a radio receiver electronically connected to a second microprocessor and a second power source for receiving the digitally encoded signals remotely from the radio transmitter;
    at least one output control from each receiving means to at least one photographic device.

2. The invention of claim 1 wherein the digitally encoded signals comprise a constant frequency radio signal which is pulsed according to a programmed series of pulses (transmissions) and non-pulses (non-transmissions) in equal time segments, wherein each equal time segment comprises a bit and eight bits constitute one byte of information in binary code.

3. The invention of claim 1 wherein the programming means comprises a keypad and an LCD display for programming the microprocessor.

4. The invention of claim 1 further comprising a means for programmably controlling output from the programmable transmitter directly to controls for at least one electrically activated device.

5. The invention of claim 1 wherein the programmable receiver further comprises a superheterodyne chip, a local oscillator, a level detector and noise control connected electrically to the second microprocessor.

6. The invention of claim 1 further comprising a nonvolatile memory electrically connected to each microprocessor.

7. The invention of claim 6 wherein the second microprocessor is programmable remotely from the programmable transmitter.

8. The invention of claim 7 wherein the second microprocessor is programmed to check commands from the transmitter for errors and, if no error is found, to execute the commands.

9. The invention of claim 8 wherein the programmable transmitter sends a series of digitally endcoded signals comprising a unique transmitter number, a receiver number, data for the receiver, commands for the receiver, and an error detection command.

10. The invention of claim 1 wherein the programmed transmitter and the programmed receiver are each housed in a hand-held case having an antenna.

11. The invention of claim 1 comprising a number of programmable receivers which each activate at least one photographic device upon digitally encoded commands sent by the programmable transmitter.

12. The invention of claim 11 wherein the digitally encoded commands from the programmable transmitter cause the programmable receivers to activate the photographic devices in a desired sequence.

13. The invention of claim 12 wherein the digitally encoded commands from the programmable transmitter cause the programmable receivers to activate the photographic devices with desired delays between activation.

14. The invention of claim 13 wherein the photographic devices comprise photographic lighting.

15. The invention of claim 13 wherein the photographic devices comprise positioning means for photographic lighting.

16. The invention of claim 13 wherein the photographic devices comprise testing devices.

17. The invention of claim 13 wherein the photographic devices comprise additional cameras.

18. The invention of claim 1 wherein the programmable receiver further comprises an indicator light.

19. A multifunction programmable transmitter for a remote control system for photographic devices wherein the programmable transmitter comprises
    a microprocessor electrically connected to a nonvolatile memory, a radio transmitter, and a power source for sending digitally encoded signals, wherein the digitally encoded signals comprise a constant frequency radio signal which is pulsed according to a programmed series of pulses (transmissions) and non-pulses (non-transmissions) in equal time segments, wherein each equal time segment comprises a bit, and eight bits constitute one byte of information in binary code;
    a keyboard and LCD display programming means for digitally encoding the radio signals.

20. A multifunction programmable receiver for a remote control system for photographic devices wherein the programmable receiver comprises a radio receiver with a superheterodyne chip, a local oscillator, a level detector and noise control connected electrically to a microprocessor with a nonvolatile memory and a power source for receiving digitally encoded signals remotely from a radio transmitter, wherein the microprocessor is programmable remotely and wherein the programmable receiver processes digitally encoded signals comprising a constant frequency radio signal which is pulsed according to a programmed series of pulses (transmissions) and non-pulses (non-transmissions) in equal time segments, wherein each equal time segment comprises a bit, and eight bits constitute one byte of information in binary code;

at least one output control from the programmable receiver to at least one photographic device, wherein the output control is regulated by the digitally encoded signals.

* * * * *